Dec. 19, 1933.          L. W. LESSLER                1,940,312
   INTERMITTENT MOVEMENT FOR MOTION PICTURE PROJECTORS AND THE LIKE
                        Filed March 12, 1931

INVENTOR.
LEW W. LESSLER.
BY
ATTORNEY.

Patented Dec. 19, 1933

1,940,312

UNITED STATES PATENT OFFICE 1,940,312

INTERMITTENT MOVEMENT FOR MOTION-PICTURE PROJECTORS AND THE LIKE

Lew W. Lessler, Johnson City, N. Y., assignor to Agfa Ansco Corporation, Binghamton, N. Y., a corporation of New York Application March 12, 1931. Serial No. 522,007

3 Claims. (Cl. 88—18.4)

My invention relates to an intermittent movement for motion picture projectors and the like and is more particularly adapted for use on small 16 m. m. size apparatus wherein it is essential that the mechanism shall occupy a limited amount of space and yet operate in a smooth, accurate and efficient manner.

The principal object of my invention lies in the provision of film engaging claw mechanism which will reciprocate intermittently in a direct vertical path and a direct horizontal path thus insuring positive and accurate film feeding action.

Another object of my invention is to provide a device of this character which is comprised of a minimum number of gears and other parts adapted to be easily assembled and timed and which are exceedingly silent and smooth in operation. This latter is of extreme importance since the advent of "home talking movie outfits" wherein when used with same it is a primary requisite that the projector operate as silently as possible.

A further and important object of my invention lies in the ratio of movement vertically and horizontally of the claw member of the intermittent movement, the gears of which are so proportioned and timed as to permit the film a projection period for each frame approximately twice as long as the time consumed in advancing the film in rapid succession from frame to frame. This feature cooperatively acting with the usual high speed shutter serves to greatly reduce and overcome flicker on the screen, thus creating a superior illusory effect and simultaneously materially reduces eyestrain.

An important feature of my invention lies in means provided for automatically compensating for any wear which may occur through the continuous operation of the moving parts.

Other objects and advantages in details of construction and arrangement of parts will be apparent as the description proceeds, reference now being had to the figures of the accompanying drawing forming a part of this application and wherein like reference numerals indicate like parts.

Figure 1:
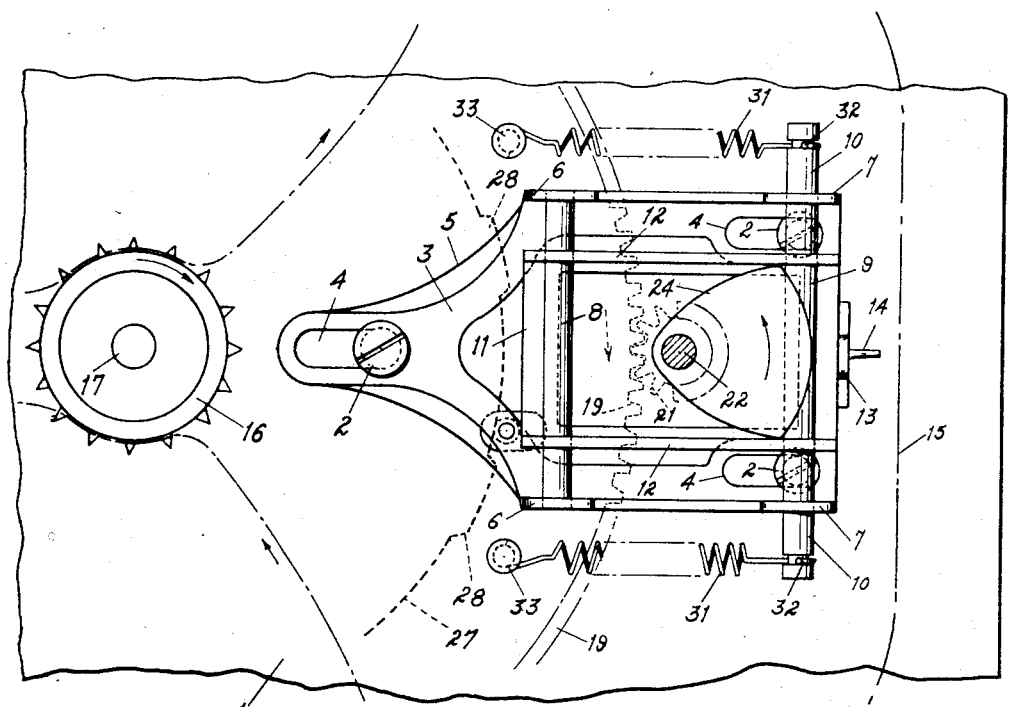
Figure 1 is a side view of my improved intermittent movement.
Figure 2:
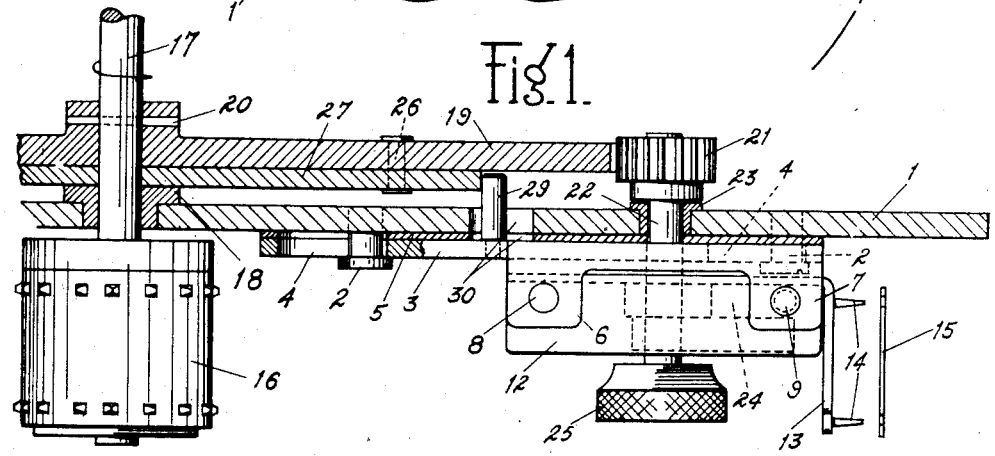
Figure 2 is a plan sectional view thereof illustrating the driving mechanism therefor.

The reference character 1 indicates a portion of the side of the projector casing or housing adapted to support my improved intermittent mechanism.

Slidably secured in horizontal position on this housing 1 as by means of three stud screws 2 triangularly disposed thereon, is a shuttle frame 3 having elongated slots 4 provided therein at points where the screws 2 pass therethrough to thus permit free and direct horizontal reciprocal movement of the frame 3. A slightly bent shim 5 preferably of spring material is interposed between the frame 3 and the housing 1 in the assembling thereof which shim flattens down substantially as shown as the screws 2 are threaded tightly into the housing and serves to frictionally maintain the frame 3 and the parts secured thereto in accurate operative alignment and also serves to compensate for any wear which might occur incident to the sliding movement of the frame.

The upper and lower sides of this frame 3 are preferably formed with outwardly extending flanges 6 and 7 between which and connecting same are vertically disposed pins 8 and 9 respectively, the pin 9 at the forward end of the frame extending a trifle above and below the flanges 7 thereof as at 10 for a purpose to be described. Mounted for direct positive perpendicular reciprocal action upon these pins 8 and 9 is a secondary shuttle frame 11 preferably formed of light sheet stock or other suitable material, provided with top and bottom outwardly extending flanges 12 and at the forward end thereof and centrally between said flanges with a right angular bent outwardly extending portion 13 rigidly secured to which in spaced relation are two projecting film engaging members 14 adapted to intermittently and cooperatively engage the usual perforations along the edges of the motion picture film 15 to advance same. It will be understood, of course, that the film 15 is threaded through the usual gate structure (not shown) positioned immediately in front of the intermittent mechanism, it being omitted from the drawing for clearness.

Rearwardly of the above described mechanism and on center with same is a film feeding sprocket 16 carried by a shaft 17 suitably journaled for rotation in a bushing 18 mounted in the housing 1 adapted to be continuously rotated by any suitable driving power such as a motor and gear train (not shown). A relatively large disk gear 19 is securely keyed as at 20 to the shaft 17 directly within the side 1 of the housing and meshes with a pinion 21 secured to a shaft 22 suitably journaled as at 23 within the side 1 of the housing.

The opposite end of this shaft 22 extends forwardly into the plane of the extended flanges 12 of the frame 11 and has eccentrically and rigidly secured thereon a substantially heart-shaped cam 24 adapted to cooperatively operate within the flanges 12 of the frame 11. Obviously rotation of the shaft 17 will result in rotation of the cam 24 and consequently the direct, positive reciprocation of the frame 11 along the axis of the pins 8 and 9 naturally resulting in the upward and downward movement of the film engaging members 14 carried thereby.

A knurled finger knob 25 may be and preferably is secured to the free end of this shaft 22 whereby to permit same to be manually rotated to bring the parts operated thereby into correct position with the film thus facilitating the threading operation.

Directly adjacent and rigidly secured as at 26 to the disk gear 19 is a proportionately smaller disk cam 27, the periphery of which is suitably provided with substantially spaced cam steps 28 adapted to periodically actuate the horizontally disposed frame 3 as by means of the cam roller 29 rigidly mounted on said frame and extending rearwardly therefrom through horizontally disposed elongated slots 30 cut, cast or otherwise suitably provided in the side 1 of the housing and the shim 5 into cam engaging position. A pair of coil springs 31 are secured at one end as at 32 to the extended ends 10 of the pin 9 of the frame 3 and anchored at their opposite ends to the housing 1 as at 33 as clearly shown in Figure 1 whereby to normally urge the frame 3 rearwardly and consequently the cam roller 29 carried thereby into engagement with the cam 27. It is obvious that upon rotation of the shaft 17, the cam 27 will be rotated and in turn by virtue of the cam roller 29 riding thereagainst will impart a direct, positive, intermittent horizontal and reciprocal movement to the frame 3, whereby to bring the film engaging portions 14 into and out of engagement with the film.

Any slight wear which might occur between the surface of the cam 27 and the cam roller 29 will be automatically compensated for by the springs 31.

The cams 24 and 27 are so disposed that the movements of the frames 3 and 11 are synchronized and so arranged that on the upward stroke of the frame 11 the claws 14 carried by the frame 3 will be out of engagement with the film 13 and upon the downward stroke of the frame 11 the claws 14 will be in engagement with the film 15 whereby to move same.

In order that the ratio of time for projecting one frame of the film 15 will be approximately twice as long as the time consumed in advancing the film, the gear 19, pinion 21 meshing therewith and the cam 27 secured thereto, are of proportionate sizes to accomplish such timing. Of course, any other ratio such as 3 to 1, 4 to 1, etc. could as easily be accomplished by merely substituting gears and cams of different ratios.

It will be observed that due to constant engagement of the moving parts with the actuating cams there is no looseness about the mechanism to rattle or become noisy during the rapid operation of the device. Hence it will be clear that I have provided an intermittent movement which is positive and direct in operation, self-compensating as far as wear of parts is concerned and which is exceedingly silent in operation.

Of course changes may be made in details of construction and operation without departing from the spirit and scope of my invention. I do not limit myself, therefore, to the exact structure herein shown and described other than by the appended claims.

I claim:

1. An intermittent film moving mechanism comprising a shaft for continuous rotation, a film sprocket, an enlarged gear and a cam member on said shaft for rotation therewith, a guided horizontally reciprocable shuttle frame having direct operative connection with said cam member, a separate vertically reciprocable claw frame on said shuttle frame and having a film engaging claw, a second shaft, a pinion thereon meshing with said enlarged gear, and a cam member on said second shaft having direct operative connection with said claw frame.

2. An intermittent film moving mechanism comprising a shaft for continuous rotation, a film sprocket, an enlarged gear and a cam member on said shaft for rotation therewith, a guided horizontally reciprocable shuttle frame having direct operative connection with said cam member, a separate vertically reciprocable claw frame on said shuttle frame and having a film engaging claw, a second shaft, a pinion thereon meshing with said enlarged gear, a cam member on said second shaft having direct operative connection with said claw frame, and spring means cooperatively acting with said shuttle frame whereby said frame is constantly maintained in operative connection with said first cam member.

3. An intermittent film moving mechanism comprising a shaft for continuous rotation, a film sprocket, an enlarged gear and a cam member on said shaft for rotation therewith, a horizontally reciprocable shuttle frame having operative connection with said cam member, a vertically reciprocable claw frame on said shuttle frame and having a film engaging claw, a second shaft, a pinion thereon meshing with said enlarged gear, and a cam member on said second shaft having operative connection with said claw frame, a plurality of divergently disposed parallel, horizontal, elongated slots in said shuttle frame and a plurality of pin members cooperatively assembled therewith whereby said shuttle frame is positively and accurately guided in the reciprocation thereof.

LEW W. LESSLER.